Dec. 16, 1969   L. M. SHEA   3,484,131

TRANSPORTABLE MOTEL TRAILER

Filed Oct. 30, 1967

INVENTOR
LEO M. SHEA

BY Barthel & Bugbe
ATTORNEYS

United States Patent Office 3,484,131
Patented Dec. 16, 1969

3,484,131
TRANSPORTABLE MOTEL TRAILER
Leo M. Shea, 20602 Lancaster Ave.,
Harper Woods, Mich. 48236
Filed Oct. 30, 1967, Ser. No. 679,042
Int. Cl. B60p 3/38
U.S. Cl. 296—23                                    5 Claims

ABSTRACT OF THE DISCLOSURE

This transportable motel trailer consists of an elongated trailer adapted to be pivotally and releasably connected to a standard tractor for transportation over highways to a location where living and sleeping accommodations are temporarily required. The trailer contains multiple living compartments, all but one of which is equipped with double deck bunk beds and a lavatory aligned with one another transversely of the trailer so as to provide wall space for a window. A dressing table, together with storage space for hanging clothes, is also provided. At least one of the compartments is preferably equipped with a shower bath. An end compartment contains heating and air conditioning equipment, as well as storage space for articles and equipment used in connection with the invention, such as bed linens, towels and janitorial equipment. Each compartment of the trailer is provided with a side door and windows, the doors preferably opening onto a running board which facilitates ascent to and descent from the compartment. Such running board is preferably hinged to reduce the width of the vehicle during transportation. The trailer chassis near its rearward end is equipped with wheels and at its forward end is provided with a conventional fifth wheel rest for pivotal engagement with and temporary attachment to a conventional fifth wheel of the tractor.

Figure 1:
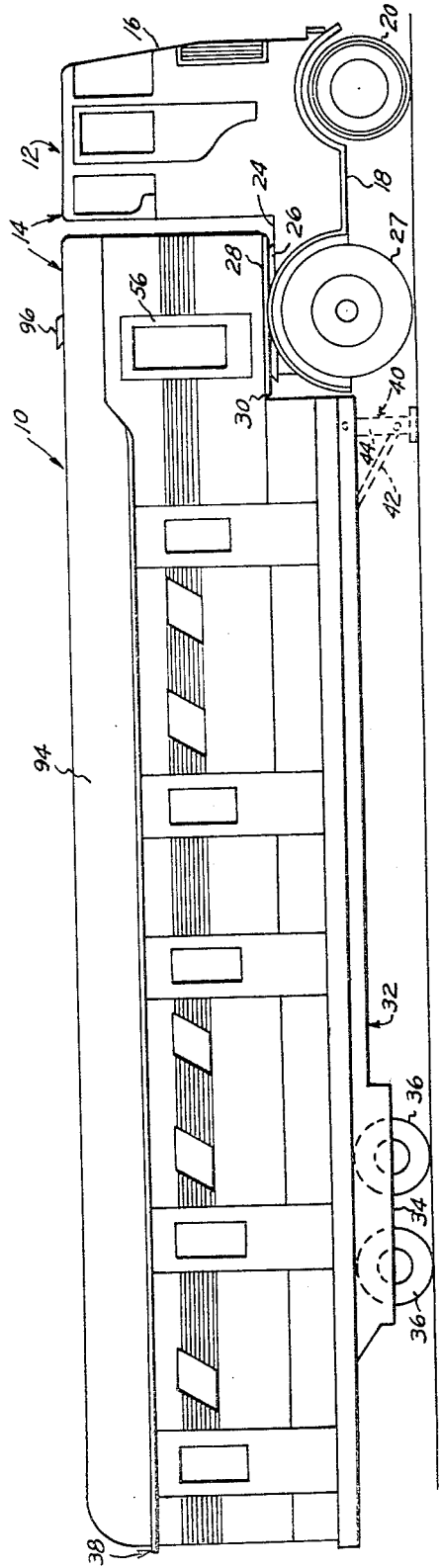

In the drawings:
FIGURE 1 is a side elevation of a transportable motel, according to one form of the invention, connected to a conventional tractor, with a prop shown diagrammatically in dotted lines lowered at its forward end to support the vehicle when detached from the tractor; and FIGURE 2 is a horizontal section through the transportable motel trailer of FIGURE 1, taken at a level immediately beneath the roof thereof.

Figure 2:
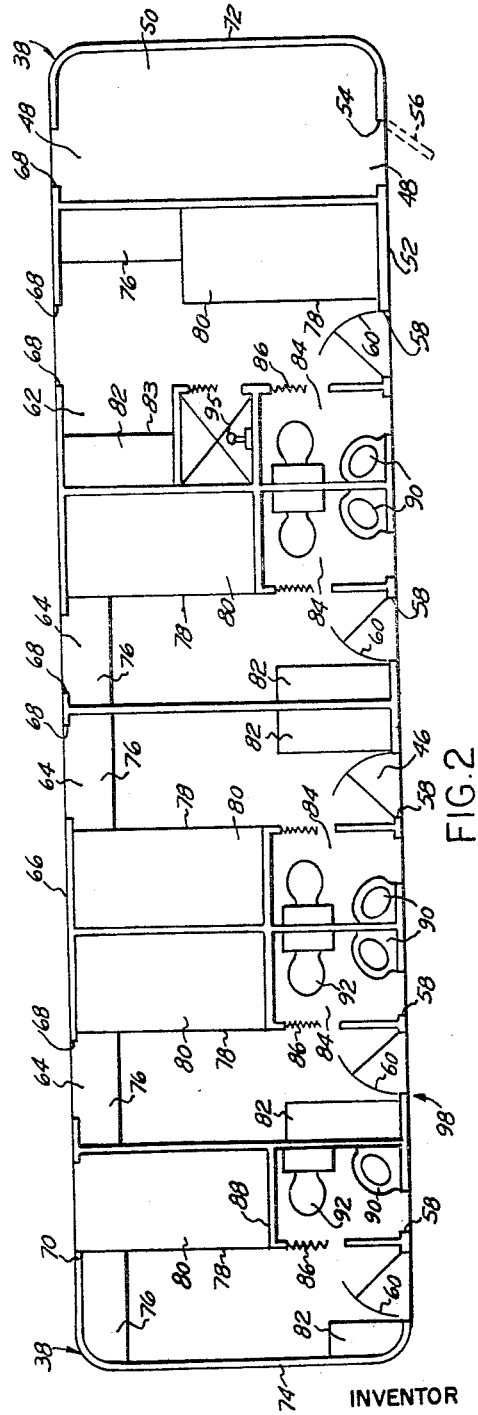

Referring to the drawing in detail, FIGURES 1 and 2 show a transportable motel trailer, generally designated 10, in its transportable condition, as pivotally connected to a conventional tractor 12 to form a tractor-trailer combination 14 for travel over highways to a location of use. The tractor 12 is of any standard type with the usual cab 16 mounted on the chassis 18 provided with steerable front wheels 20 and motor-driven rear wheels 22. Mounted on the rear deck 24 of the tractor chassis 18 is a conventional fifth wheel 26 which is engaged by a fifth wheel trailer component 28 mounted on the raised forward end portion 30 of the trailer chassis 32. The latter near its rearward end is provided with a rear wheel suspension unit 34 containing springs (not shown) and axles rotatably supporting rear wheels 36, preferably tandem rear wheels to support the heavy weight of the trailer body 38 mounted on the trailer chassis 32. Near its forward end immediately aft of the raised trailer chassis portion 30 containing the fifth wheel component 28 is preferably mounted a conventional swinging prop unit 40 pivoted at its upper end to the trailer chassis 32 and provided with the usual inclined braces 42 pivoted at their lower ends to the prop uprights 44 and at their upper ends to conventional prop-operating mechanism (not shown). Such prop operating mechanisms are well known to those skilled in the tractor-trailer art and are available in various forms on the open market and shown in many prior patents. It will be understood that the prop structure 40 is retracted upwardly and rearwardly after connection has been made between the fifth wheel components 26 and 28. In place of the conventional prop structure 40, it will be understood that when it has arrived at its location, the forward end portion of the trailer chassis 32 may be temporarily supported in any suitable way, such as upon concrete blocks (not shown) or other adequately strong supporting structure. Neither the prop 40 nor such supporting structure forms any part of the present invention.

The motel trailer body 38 has a floor 46 mounted on the chassis 32 throughout the length thereof and overhanging rearwardly the rear wheel suspension unit 34. At its forward end, the floor 46 is raised at 48 along with the raised portion 26 of the chassis 32 to provide a storage compartment 50 above the fifth wheel component 28. The body 38 is provided at intervals therealong with transversely-extending partitions 51 and also along the curb side wall 52 thereof with an elevated door opening 54 having a door 56 therein for access to the storage compartment 50, and with living compartment door openings 58 having doors 60 therein giving access to the living compartments 62 and 64. The single living compartment 62 is larger than the four remaining compartments 64, as set forth below. The curbside wall 52 and the roadside wall 66 are provided with window openings 68 equipped with windows 70. The forward wall 72 and rearward wall 74 of the body 38 are preferably without windows.

Each of the living compartments 62 and 64 is provided with a dressing table 76, preferably built-in, and adjacent it in a sleeping alcove 77 extending transversely of each living compartment 64 along one of the partitions 51 is a built-in double-deck bunk unit 78 having two beds 80 arranged one above the other, only the uppermost one of which is shown in the drawing. Each of the living compartments 62 and 64 is also provided with a clothes closet storage subcompartment or space 82 with a folding door 83 and in one corner of each compartment 64 aligned with the end of the alcove 77 is a lavatory subcompartment or room 84 equipped with a folding door 86. Each lavatory compartment 84 has an enclosing wall 88 in which the opening for the door 86 is located, and also has a washbowl fixture 90 and a toilet bowl fixture 92 provided with the usual plumbing arrangement and piping leading to a a water storage tank and pump (not shown), preferably located in the storage compartment 50. The toilets 92 are preferably of the chemical type. In addition, the single living compartment 62 is provided with a shower bath compartment 93 equipped with a shower bath spray nozzle or fixture 95 also connected by plumbing piping to the storage tank (not shown). A running board 98, preferably hinged to the body 38, extends the length of the trailer 10 aft of the raised portion 30 of the chassis 32 beneath the door openings 58 to facilitate entering and leaving the living compartments 62 and 64. The roof 94 is preferably provided with ventilation hatches 96, one only being shown in FIGURE 1.

In the use of the transportable motel trailer 10, during transport the trailer 10 is coupled to the tractor 12 by the fifth wheel components 26 and 28, the prop unit 40 being swung upward out of contact with the roadbed in the usual way. When the tractor-trailer combination 14 arrives at its destination, the driver of the tractor 12 backs the trailer 10 into its desired location and lowers the prop unit 40, as shown in the dotted lines in FIGURE 1, in the usual way. He then uncouples the fifth wheel components 26 and 28 and is then able to drive away his tractor 12 to pick up another trailer 10 or use it for other purposes. The running board 98, if hinged to the body 38, is then lowered to enable the future occupants of the trailer motel 10 to easily enter and leave. A threesided folding sheet metal screen (not shown) is then preferably attached at its upper edge to the front end and sides of the raised forward end portion 30 so as to extend therearound and conceal it and the fifth wheel component 28 carried by it from view.

It will also be understood that the motel trailer 10 may, if desired, be placed upon a permanent foundation, with or without removing the rear wheel suspension unit 34 and prop unit 40. This is presently done with conventional house trailers and forms no part of the present invention.

I claim:

1. A transportable highway motel trailer, comprising a vehicle chassis having a coupling means at one end adapted to be detachably connected to a towing vehicle and having supporting wheels connected to said chassis therebeneath, and a body mounted on said chassis and having a plurality of longitudinally-spaced transverse partitions therein subdividing the interior thereof into a plurality of separate living compartments extending transversely of said body and disposed in abutting succession therealong, said body on one side thereof having a door for each of said living compartments, each of said living compartments having in a corner thereof adjacent one of said partitions a lavatory subcompartment containing a toilet bowl fixture and a washbowl fixture, and also having a sleeping alcove disposed adjacent said one partition and extending therealong in alignment with said lavatory subcompartment, each of said living compartments on the side of said body opposite its respective door having a window opening containing a window.

2. A transportable highway motel trailer, according to claim 1, wherein said body also has a utilities compartment therein, wherein said chassis has a forward end portion raised above the remainder thereof and carrying said coupling means, and wherein said body also has a raised portion disposed above said forward end portion, said utilities compartment containing heating and air conditioning equipment disposed within said raised portion.

3. A transportable highway motel trailer, according to claim 1, wherein each of said alcoves of said living compartments has a built-in bed structure therein extending transversely of said body.

4. A transportable highway motel trailer, according to claim 1, wherein each of said living compartments has a storage subcompartment therein disposed opposite said lavatory subcompartment and said sleeping alcove.

5. A transportable highway motel trailer, according to claim 1, wherein each of said living compartments also has a dressing table therein disposed beneath its respective window.

References Cited

UNITED STATES PATENTS

| 1,943,472 | 1/1934 | Frazer | 296—28.1 |
| 1,174,703 | 3/1916 | Flagg | 296—23 X |

FOREIGN PATENTS 1,346,115  11/1963  France.

PHILIP GOODMAN, Primary Examiner

U.S. Cl. X.R.

296—28